United States Patent [19]

Dolby

[11] 3,909,733

[45] Sept. 30, 1975

[54] DYNAMIC RANGE MODIFYING CIRCUITS UTILIZING VARIABLE NEGATIVE RESISTANCE

[75] Inventor: Ray Milton Dolby, London, England

[73] Assignee: Dolby Laboratories, Inc., New York, N.Y.

[22] Filed: May 14, 1974

[21] Appl. No.: 469,837

[30] Foreign Application Priority Data

May 17, 1973 United Kingdom............... 23638/73
Sept. 5, 1973 United Kingdom............... 41673/73

[52] U.S. Cl. .................. 328/165; 325/62; 328/171; 333/14; 307/237

[51] Int. Cl.²............................................ H04B 1/64

[58] Field of Search ...... 333/14, 17, 80 R; 328/162, 328/165, 167, 171; 325/376, 377, 381, 62

[56] References Cited

UNITED STATES PATENTS

| | | | |
|---|---|---|---|
| 2,589,723 | 3/1952 | Miller, Jr. | 333/17 |
| 3,051,846 | 8/1962 | Schott | 333/80 R X |
| 3,562,675 | 2/1971 | Urell | 333/17 |
| 3,775,705 | 11/1973 | Dolby | 333/14 |

FOREIGN PATENTS OR APPLICATIONS

| | | | |
|---|---|---|---|
| 963,964 | 5/1957 | Germany | 333/14 |

*Primary Examiner*—Paul L. Gensler
*Attorney, Agent, or Firm*—Robert F. O'Connell

[57] ABSTRACT

Dynamic range modifying circuits, namely compressors and expanders, are disclosed in which series connected circuits respond to current or voltage drive to provide voltage or current output. One circuit has characteristics which do not vary with dynamic range and contributes a component to the output having dynamic range linearity relative to the input. A second circuit has variable impedance characteristics and contributes a component which does not have dynamic range linearity relative to the input and which effects the dynamic range modification. Devices are described in which the variable impedance characteristics include effective negative resistance which is itself varied and is shunted by a variable reactance. Devices are also described in which the second circuit is a two terminal network which responds to the current between the two terminals to determine the voltage therebetween and wherein the voltage is derived either by way of a variable filter which acts to restrict the voltage or by way of multiple paths including filters and limiters.

40 Claims, 21 Drawing Figures

Figure 2A:
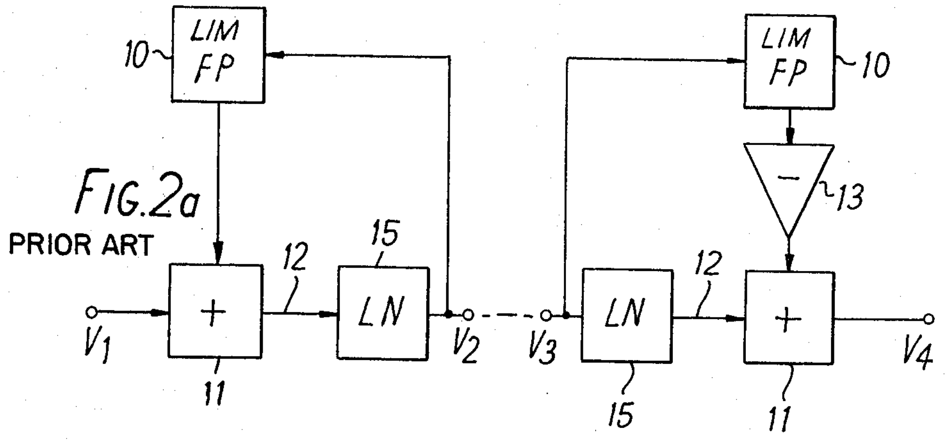
FIG. 2a PRIOR ART

PRIOR ART FIG. 1a
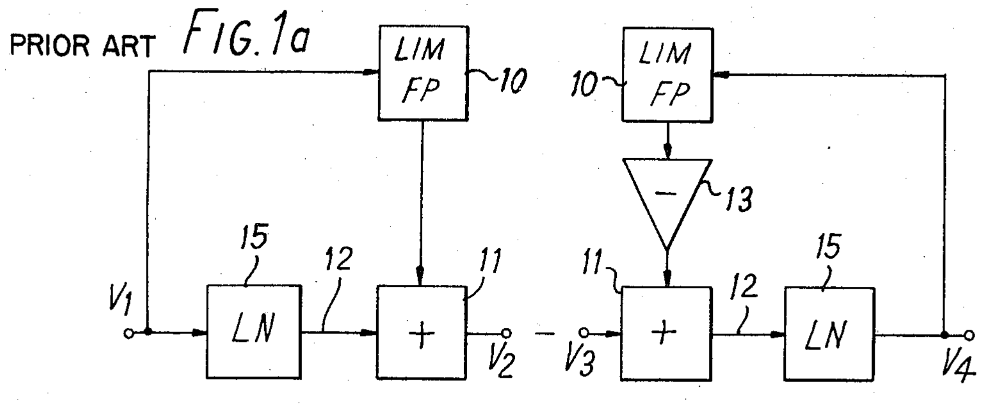
PRIOR ART FIG. 1b
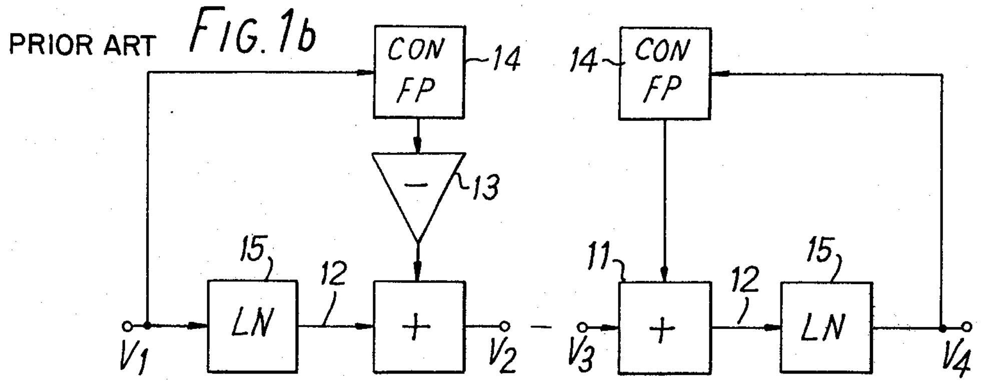
FIG. 1c
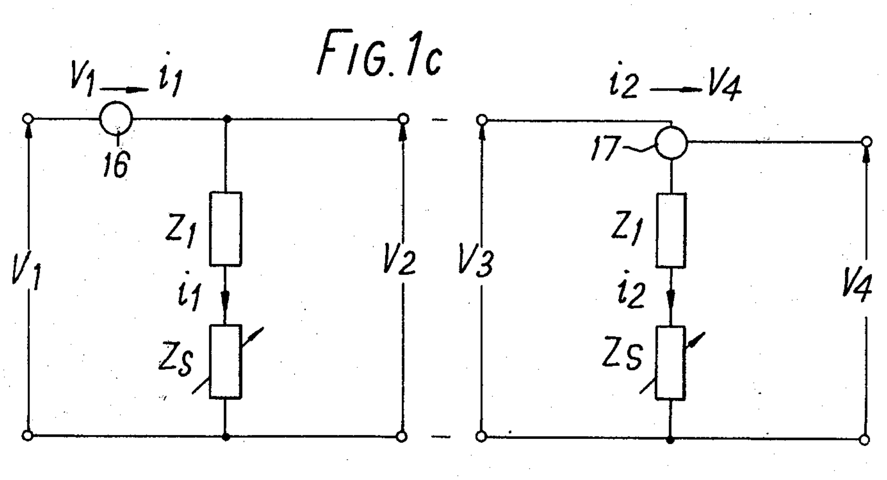

DYNAMIC RANGE MODIFYING CIRCUITS UTILIZING VARIABLE NEGATIVE RESISTANCE

This invention relates to signal compressors, expanders and noise reduction systems and concerns improvements in the inventions described in the following specifications of patents or patent applications, which will be referred to by the listed designations, 1. Series mode: Ser. No. 432,171 filed Jan. 10, 1974, now abandoned and refiled as continuation-in-part application Ser. No. 509,076, filed Sept. 25, 1974.
2. Type 1: Ser. No. 397,159 filed Sept. 13, 1973 now Pat. No. 3,846,719.
3. Type 2: Ser. No. 395,562 filed Sept. 10, 1973.
4. Types 3 and 4: Ser. No. 356,126 filed May 1, 1973, now U.S. Pat. No. 3,828,280.
5. B-type: U.S. Pat. No. 3,631,365.

Briefly stated, Type 1 and Type 2 devices (specifications (2) and (3).) create a compressor or expander characteristic by the combination with a linear signal component of a limited further component, the signal components being handled by parallel signal paths. The series mode specification (1) describes circuits analogous to Type 1 and Type 4 devices in which the linear and further components are formed and combines in a series circuit. The Types 3 and 4 specification (4) describes devices in which the signal components are again handled by parallel signal paths but in which the further component is not limited but is treated by a device called a conveyor, that is to say a device which passes a signal linearly above a given threshold but which, below the threshold, has a gain which falls as the signal level falls. Finally the B-type specification (5) is concerned with a particular form of Type 1 system particularly suited for consumer audio equipment, especially tape recorders.

One of the most important operative features of the applicant's signal processing devices is that, in one way or another, a main or dynamically unmodified signal component is transferred from the input to the output, with subsequent signal accuracy and freedom from distortion. The dynamic modifications for noise reduction need take place only at low levels, which allows a noise reduction signal boosting or bucking technique to be used, whether with voltages, currents, or impedance components. The particular input or output arrangements, linear component transfer methods, or signal component combination techniques which are used are of secondary importance. Thus the parallel and series modes merely represent alternative forms of the same basic idea.

The present patent application concerns further development of the above mentioned series mode concept. Also examined and clarified are the relationships between the series mode and the various embodiments of the parallel mode.

In the previous series mode specification (1) a type of device was described for modifying the dynamic range of an input signal by means of a serially connected combination of impedance networks. The series combination is connected to a signal source, having a specified impedance which may include low impedance voltage sources and high impedance current sources; the impedance of the source may also be regarded as part of the series combination of impedance networks. The output signal may be the voltage developed across one or more of the networks or it may be derived from the current through the combination, such as by the voltage dropped across a resistor, or another fixed impedance, or by means of current to voltage converters. True reciprocity of compression and expansion can be obtained if in one case current drive is applied to the combination and the output is the voltage across the combination and in the other case voltage drive is applied to the combination and the output is derived from the current through the combination.

Dynamic range modification is achieved by making at least one of the impedance networks variable in response to one or more signals in the combination. If compressors and complementary expanders are to be used in noise reduction systems it is important that signal modulated noise effects should be avoided. This is best achieved by ensuring that the various portions of the frequency spectrum are compressed or expanded as independently of each other as possible. Thus, the degree of compression or expansion (i.e. the noise reduction) obtained at the extreme high audio frequencies, for example, should be influenced as little as possible by the signal levels at low and mid frequencies.

Compressors or expanders which operate in accordance with these principles employ frequency selective circuits which restrict the modified characteristic to restricted portions of the frequency band forming a part or parts of the specified frequency band, which can be referred to as the overall band. When a high-level component appears at any frequency within a restricted hand, the circuit adapts itself and causes the restricted band to narrow to exclude the said frequency, at which frequency the normal characteristic thereby obtains. The modified characteristic still applies within the narrow restricted band, whereby compressor or expander action, and hence noise reduction, is still effected within this narrowed band. This may be referred to as the narrowing band principle since the restricted band undergoes a narrowing action to confine compression, expansion and noise reduction to frequencies where only low-level signal components are present. By this method a high degree of compression and expansion can be maintained at frequencies removed from the high-level signal frequency, with consequent good noise reduction and avoidance of signal modulated noise effects.

Thus compressors, expanders, and noise reduction systems based upon series connected impedance networks should preferably employ impedance networks which provide band restricting or narrowing characteristics. The previous series mode specification (1) described such operation in general terms and provided simple illustrative examples of practical embodiments. The present application further develops the series mode concept.

Figure 2B:
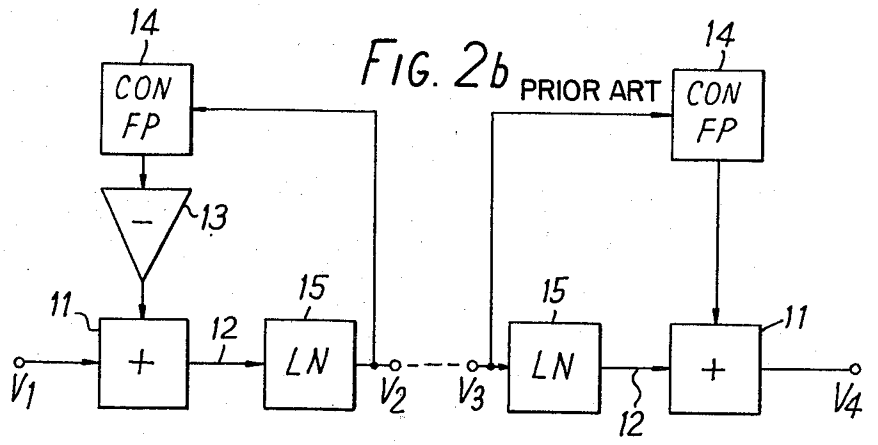
FIG. 2b PRIOR ART
Figure 2C:
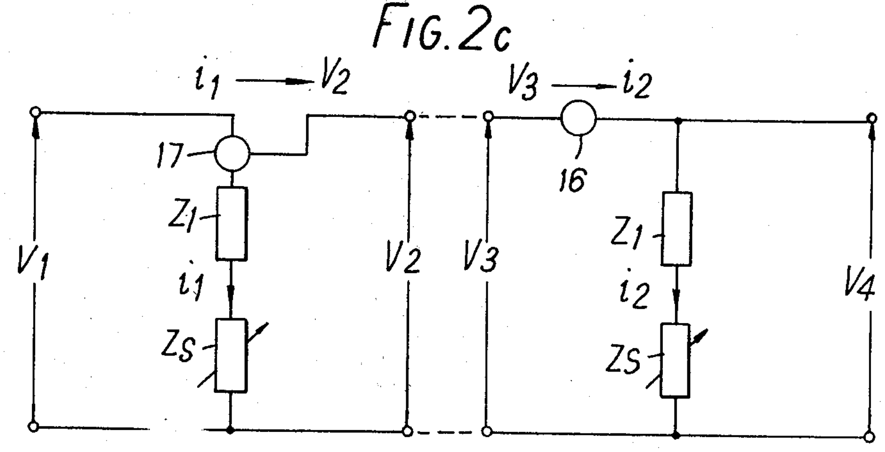
Figure 3A:
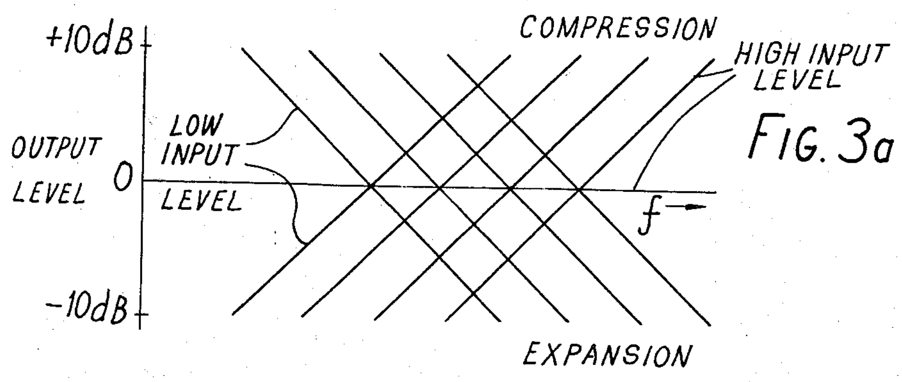
Figure 3B:
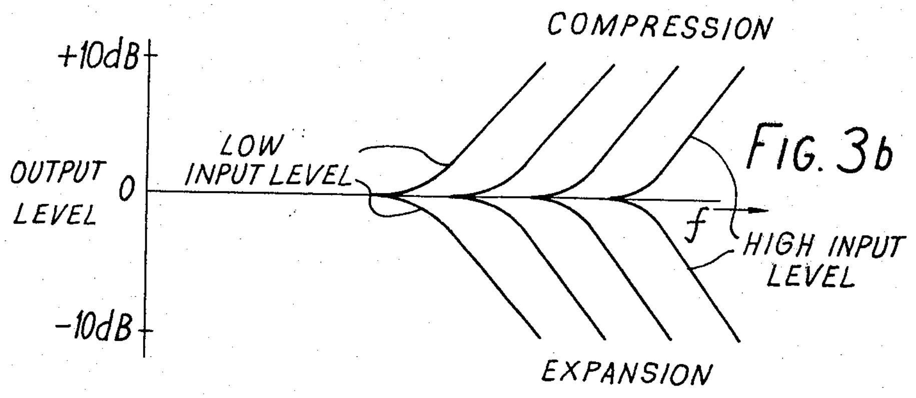
Figure 3C:
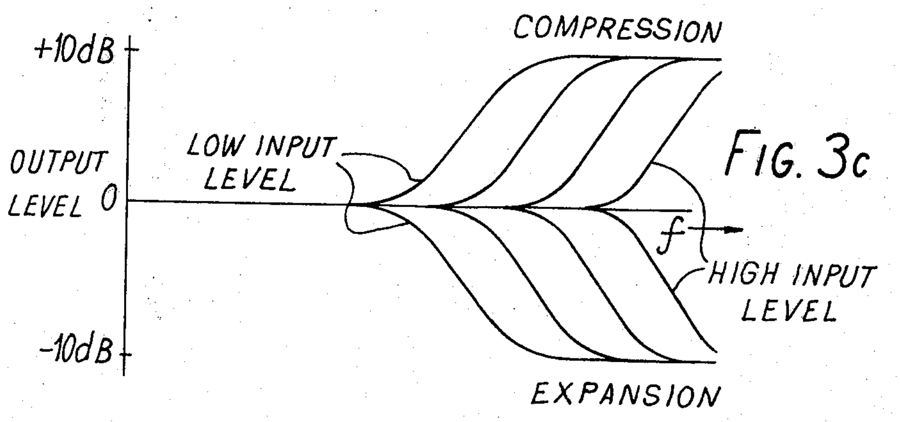
Figure 4:
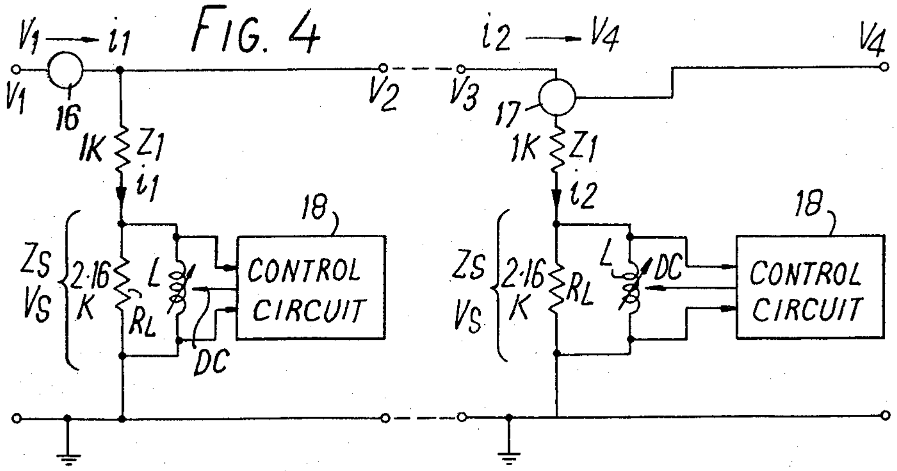
Figure 4A:
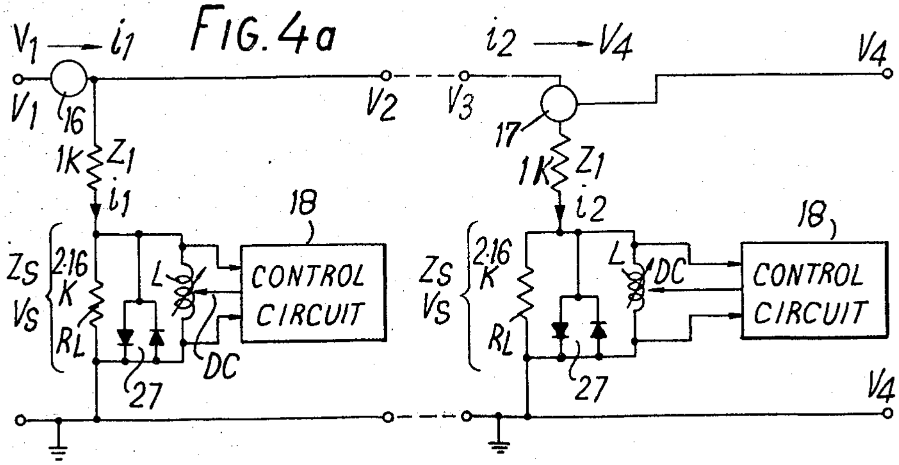
Figure 5:
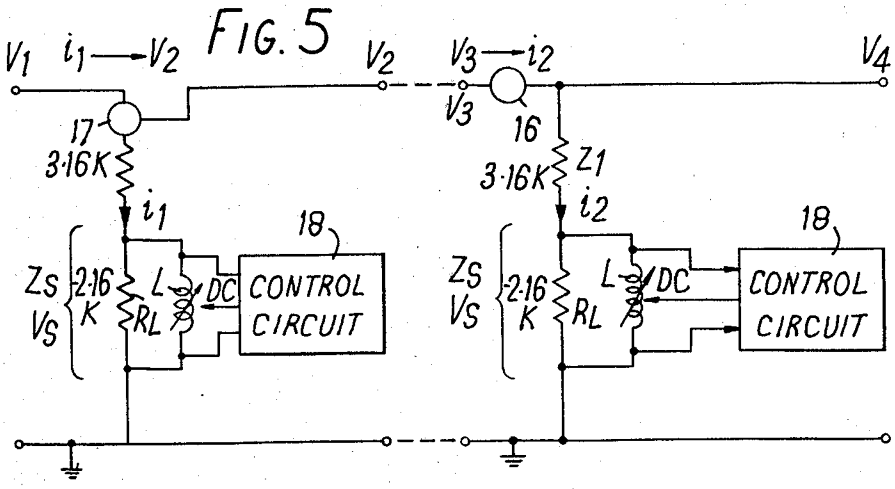
Figure 6:
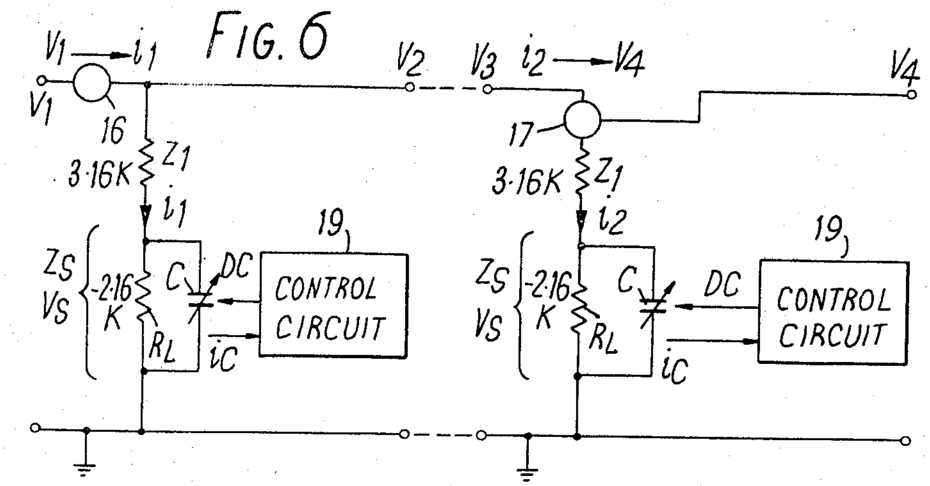
Figure 7:
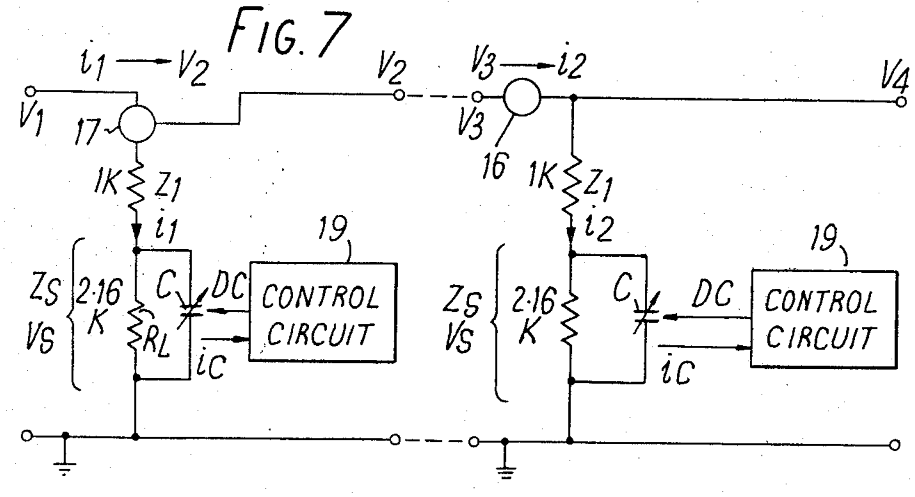
Figure 8:
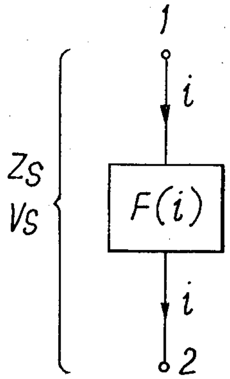
Figure 8A:
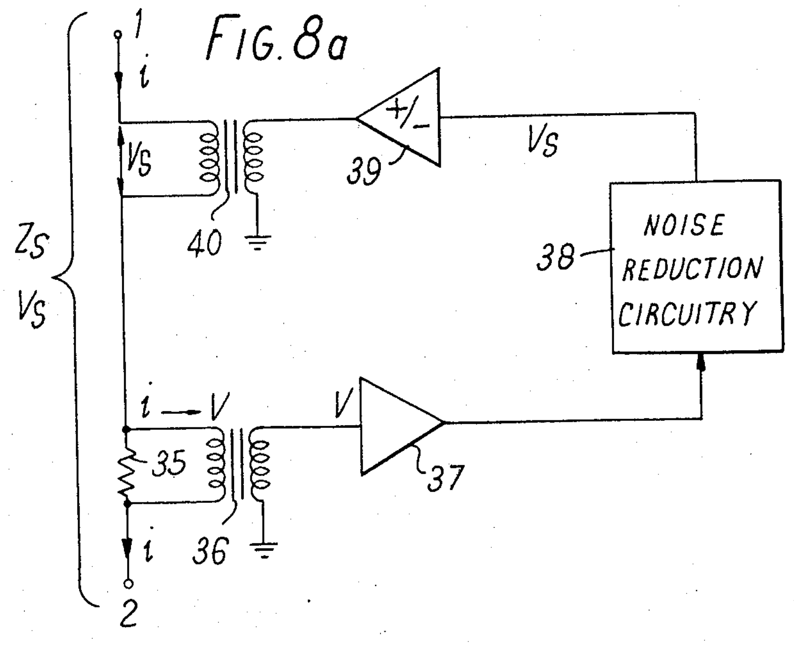
Figure 9:
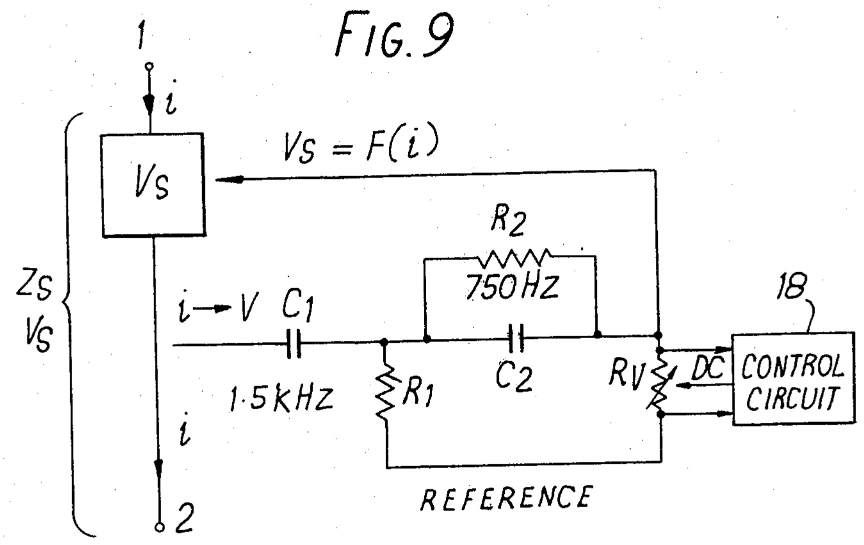
Figure 9A:
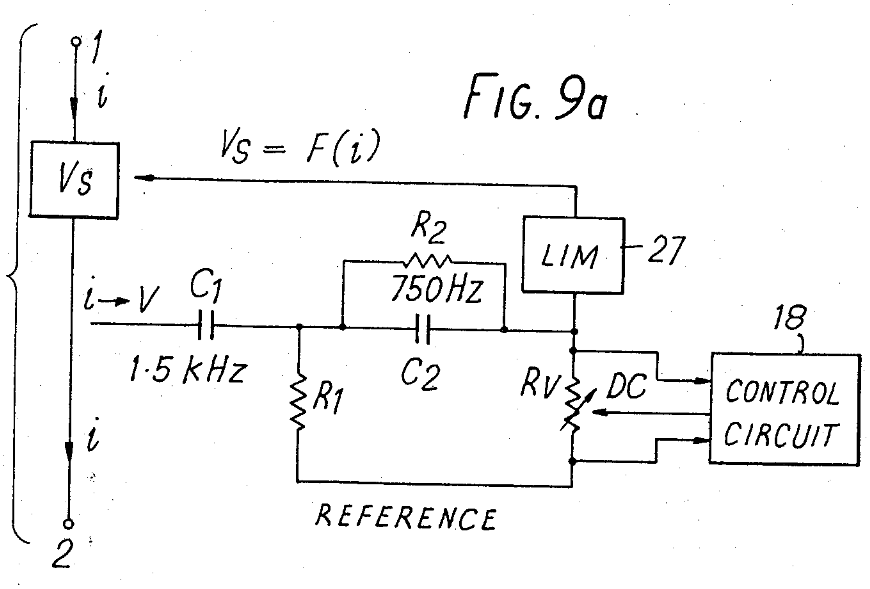
Figure 9B:
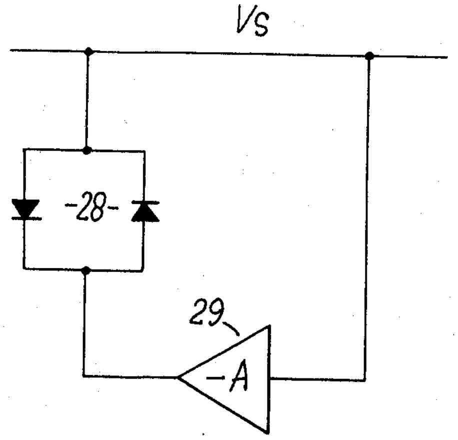
Figure 10:
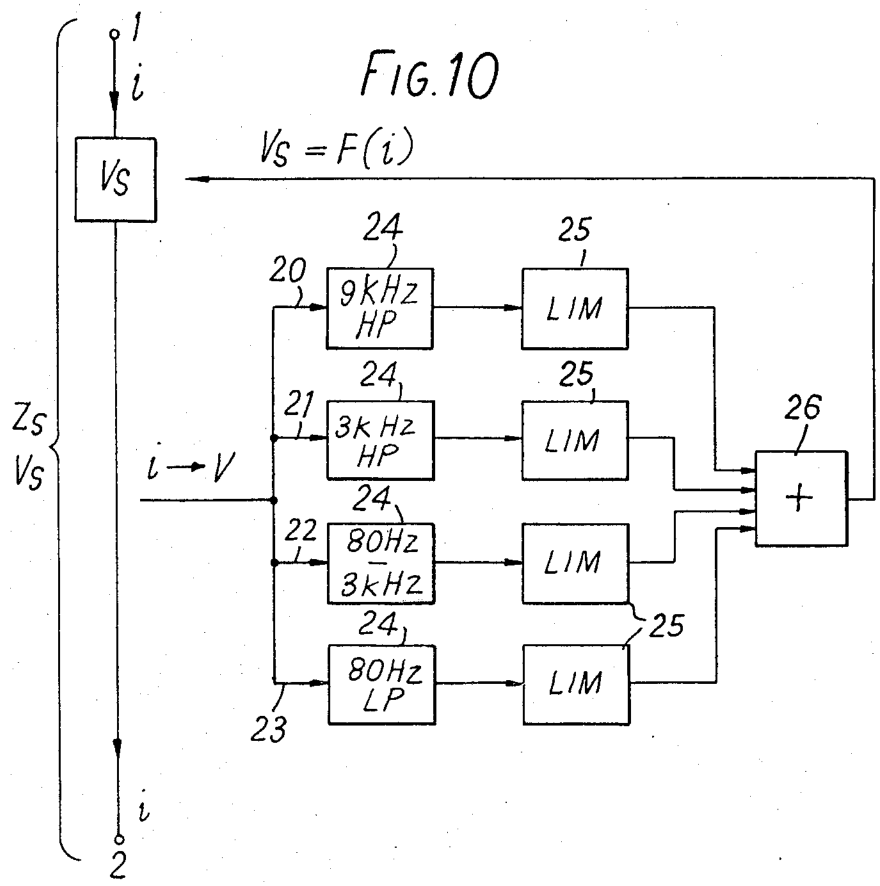
Figure 11:
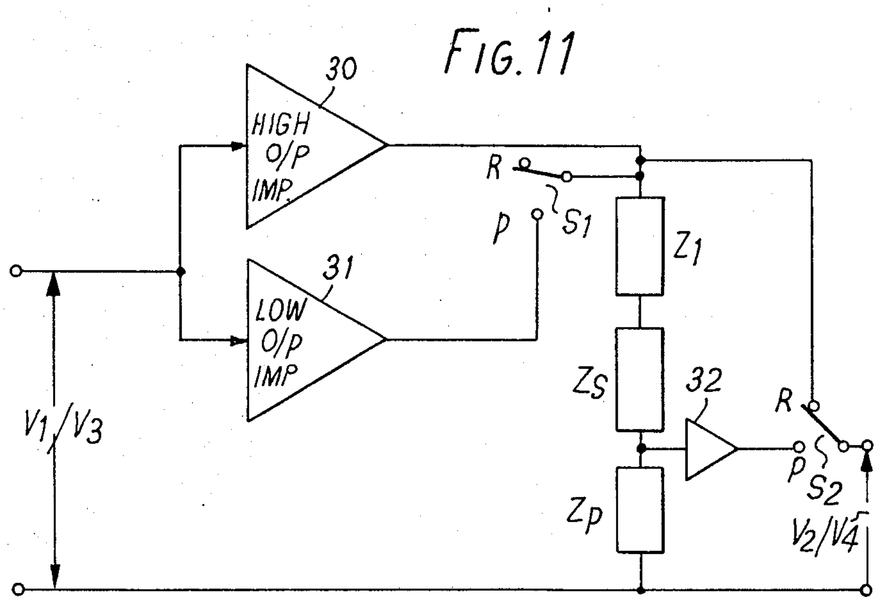

The invention will be explained with reference to the accompanying drawings, in which:

FIG. 1*a* is a schematic representation of a Type 1 parallel mode noise reduction system, FIG. 1*b* is a schematic representation of a Type 3 parallel mode noise reduction system, FIG. 1*c* is a schematic representation of a Type 1 or Type 3 series mode noise reduction system, FIG. 2*a* is a schematic representation of a Type 2 parallel mode noise reduction system, FIG. 2*b* is a schematic representation of a Type 4 parallel mode noise reduction system, FIG. 2*c* is a schematic representation of a Type 2 or Type 4 series mode noise reduction system, FIG. 3*a* shows the compression and expansion probe-tone responses of series mode compressors and expanders using a simple frequency selective impedance network, FIG. 3*b* shows the compression and expansion probe-tone responses of series mode compressors and expanders using the series combination of a linear impedance and a simple frequency selective impedance network, FIG. 3*c* shows the compression and expansion probe-tone responses of series mode compressors and expanders using the series combination of a linear impedance and a frequency selective impedance network which places a limitation upon the degree of dynamic range modification, FIG. 4 is a schematic circuit diagram of a Type 1 series mode high-frequency noise reduction system, FIG. 4*a* shows the circuit of FIG. 4 modified by the inclusion of overshoot-limiting diodes, FIG. 5 is a schematic circuit diagram of a Type 2 series mode high-frequency noise reduction system, FIG. 6 is a schematic circuit diagram of a Type 3 series mode high-frequency noise reduction system, FIG. 7 is a schematic circuit diagram of a Type 4 series mode high-frequency noise reduction system, FIG. 8 shows a generalized frequency selective impedance network;

FIG. 8*a* shows a practical realisation of FIG. 8;

FIG. 9 shows a frequency selective impedance network which is suitable for consumer noise reduction systems, FIG. 9*a* shows a modification of FIG. 9 with means for limiting overshoot, FIG. 9*b* shows one circuit which may be used for limiting overshoot, FIG. 10 shows a frequency selective network for a professional noise reduction system, and FIG. 11 shows a circuit which can be switched to operate either as compressor or expander.

First it will be useful to relate the configurations of the present invention to those of the previous Types 1 to 4 parallel mode compressors, expanders, and noise reduction systems. Referring to FIG. 1*a*, a Type 1 parallel mode noise reduction system is shown. In this configuration, a limiting further path 10 is driven from a signal derived from the input signal $V_1$ in the case of the compressor and from the output signal $V_4$ in the case of the expander. The signal component provided by the further path 10 is added, in the compressor, by a combining circuit 11 to a main signal component provided by a main path 12 to form the compressor output signal $V_2$. This signal becomes, after transmission and reception or after recording and playback, the expander input signal $V_3$, which is $V_2$ contaminated by noise. This noise is reduced relative to the pre-compressed information signal by the action of the expander. In the expander, the output of the further path 10 is subtracted from the main component $V_3$ as is schematically shown by an inverter 13 preceding the combining circuit 11. Similarly in the Type 3 configuration shown in FIG. 1*b*, the conveying further path 14 has input signals derived from the compressor input signal $V_1$ and from the expander output signal $V_4$. The further path component is now subtracted from the main path component in the compressor and added to the main path component in the expander. It can be seen that this leads to compression of $V_2$ relative to $V_1$ and expansion of $V_4$ relative to $V_3$ given that the further path has conveyor characteristics as defined above; see also specification (4) for further explanation.

Linear networks 15 may be included in the main signal path, but usually such a network merely provides amplification or attenuation. However, the essential characteristic of networks 15 is that they have dynamic range linearity at any given frequency. The frequency or phase response is not necessarily linear and may be given predetermined characteristics in order to achieve equalization, for example.

In the series mode the configurations corresponding to Types 1 and 3 are shown in FIG. 1*c*. An input signal $V_1$ is transformed into a proportional current $i_1$ which passes through the combination of impedance networks $Z_1$ and $Z_s$. The voltage to current conversion is represented schematically by a small circle 16; in practice $i_1$ may be provided by a high impedance signal source. $Z_1$ is a fixed impedance network and $Z_s$ is a frequency selective impedance network with variable (i.e. non-linear) characteristics appropriate to a low-level compressor circuit (e.g. with a threshold of from 20 dB to 40 dB below the nominal maximum signal level). The output of the compressor is the voltage $V_2$ developed across the combination in response to the current $i_1$. The voltage $V_2$ is transmitted or recorded and played back and subsequently appears as the proportional voltage $V_3$ (contaminated by noise) at the input of the expander. The voltage $V_3$ is applied across the same impedance combination as in the compressor. As a consequence, a current $i_2$ is produced which is the same as or proportional to $i_1$ in the compressor. A current to voltage converter than transforms the current $i_2$ into a voltage $V_4$ which is the output voltage of the expander. In this way the expander provides a voltage $V_4$ which is proportional to the compressor input voltage $V_1$ . The current to voltage conversion is represented schematically by a small circle 17; in practice $V_4$ may be picked off a small resistor in series with $Z_1$ and $Z_s$.

The essential feature of the impedance $Z_1$, $Z_s$ is that it shall fall in value as $i_1$ or $i_2$ increases. In the compressor this compresses the dynamic range of $V_2$ because $V_2$ is dropped across a smaller impedance at high levels than at low levels. In the expander the same feature expands the dynamic range of $V_4$ because $i_2$ is driven through a smaller impedance at high levels than at low levels. This action does not necessitate the presence of $Z_1$; only the variable impedance $Z_s$ is, as explained further below, absolutely essential.

However, it is necessary to have both $Z_1$ and $Z_s$ if it is to be possible to draw an analogy with the Types 1 and 3 parallel mode devices, to attain the advantage of these parallel mode devices (namely that high level signals are treated by circuits acting linearly with respect to dynamic range), and to distinguish between Type 1 and Type 3 series mode devices.

Considering therefore the situation with $Z_1$ and $Z_s$ both present, $Z_1$ corresponds to the main path of the parallel mode and establishes a component of $V_2$ or $i_2$ having dynamic range linearity with respect to $V_1$ or $V_3$ as the case may be. $Z_1$ may be pure resistance although, by analogy with the linear network 15, it may be a more complex impedance introducing a non-linear frequency or phase response while preserving linearity with respect to dynamic range. $Z_s$ corresponds to the further path and may be a variable resistance but preferably is a complex impedance such that the compressor and expander actions are affected by the narrowing band principle, as explained below.

In the case of a Type 1 series mode device, the resistive component of the impedance $Z_s$ is positive in the restricted band and increases as $i_1$ or $i_2$ increases so as to increase the total impedance of $Z_1$ and $Z_s$ as required in accordance with the foregoing explanation. In the case of a Type 3 series mode device, the resistive component of the impedance $Z_s$ is negative (but less than that of $Z_1$) in the restricted band and decreases in magnitude as $i_1$ or $i_2$ increases so as again to increase the total impedance of $Z_1$ and $Z_s$.

The counterpart Type 2 and Type 4 situations are illustrated in FIGS. 2*a*, 2*b* and 2*c*. In FIG. 2*a* a parallel mode compressor is shown with the limiting further path 10 having an input signal derived from the compressor output. The complementary expander has the limiting further path with input signal derived from the expander input. FIG. 2*b* shows the corresponding Type 4 case in which the further path has conveying rather than limiting characteristics. The combination of the main and further path components is in each case as in the corresponding one of FIGS. 1*a* and 1*b*.

The series mode noise reduction system of FIG. 2*c* has a compressor with an input voltage $V_1$ applied to an impedance network combination of $Z_1$ in series with $Z_s$, which results in a current $i_1$. The current represents the output quantity in response to the input quantity $V_1$ which is in accordance with the FIGS. 2*a* and 2*b* of the parallel mode. The output signal of the compressor thus is obtained by deriving an output signal $V_2$ in response to the network current $i_1$.

After transmission or recording, the compressor signal $V_2$ appears as the expander input signal $V_3$. In FIGS. 2*a* and 2*b* it is seen that in the Types 2 and 4 parallel modes the further path input signal is derived from the expander input. Thus, the expander input signal $V_3$ is transformed into a proportional current $i_2$ which passes through both $Z_1$ and $Z_s$. The output signal $V_4$ is the voltage drop across the network combination. The noise reduction system output $V_4$ is thus proportional to the input $V_1$.

In FIG. 2*c* the impedance $Z_1$, $Z_s$ must increase as $V_1$ increases. This compresses the dynamic range of $V_2$ since $V_1$ is applied to a larger impedance at high levels than at low levels and expands the dynamic range of $V_4$ since $V_4$ is dropped across a larger impedance at high levels than at low levels. In a Type 2 series mode device, the increase of impedance is achieved by by making the resistive component of the impedance $Z_s$ negative and decreasing the magnitude of the negative impedance as $i_1$ or $i_2$ increases. In a Type 4 series mode device, the increase of impedance is achieved by making the resistive component impedance $Z_s$ positive and increasing $Z_s$ as $i_1$ or $i_2$ increases.

In all cases the fixed impedance $Z_1$ is optional. Compressors and expanders for use in noise reduction systems are best provided with $Z_1$, however, in order that a linear signal component, free from distortion, is produced at high signal levels. The impedance $Z_s$ is a variable impedance network so arranged to restrict the range of frequencies in which dynamic modification takes place as the signal level rises above the threshold. The impedance presented by $Z_s$ may be relatively simple or it may be highly complex as a function of frequency and level. At any given frequency and level the impedance presented may be resistive or reactive or a combination thereof. The resistive component may have either positive or negative values, as explained above. Such impedance may be produced by fixed elements in combination with variable elements and the techniques employed are many and varied, including passive circuits, utilizing resistors, capacitors, inductors, and transformers, or active circuits, such as feedback amplifiers, Miller effect circuits, gyrator techniques and the like, all of which are known to those in the art. The only circuit constraint is that the resultant impedance should be a two-terminal impedance — that is to say a network which produces a voltage across its terminals in response to a current passed therethrough or a current therethrough in response to a voltage applied across the terminals. Of course, the circuitry required to produce the impedance may include supply connections. However, these should not interfere with the impedance produced. The impedance may be entirely floating with respect to the supply references or it may have one terminal connected to a supply reference, but of course this restricts the way in which the impedance can be used.

FIGS. 3*a*, 3*b* and 3*c* provide further clarification of the way in which the frequency selective impedance network affects applied signals. FIG. 3*a* shows the case in which $Z_1$ is omitted and $Z_s$ is a simple frequency selective impedance having the characteristics of a variable inductance used in a Type 1 or Type 2 device and which provides a voltage boost at high frequencies, in response to an input current. The rising lines of the graph show low-level probe tone responses of the network under various controlling signal conditions. The falling lines similarly show the expansion characteristics.

Where compressors or expanders are used in noise reduction systems, it is preferable if a linear component is provided in the impedance combination. FIG. 3*b* shows the case in which $Z_1$ is a resistor and $Z_s$ again simply has the characteristics of a variable inductor. The graph shows the probe tone responses of the compressor and expander using such a network. However, without a limit on the amount of boost during compression, a practical problem may be high frequency overload of the medium and/or an excessive compression ratio (dB in vs. dB out at a given high frequency). In expansion the rapidly falling curves at high frequencies may result in noise modulation effects in the absence of a modification limitation. Further there may be a modulation of the overall frequency response of the noise reduction system if there is gain or loss or a changed frequency response characteristic in the recording or transmission channel.

Thus, in a practical noise reduction system a modification limitation should be provided. FIG. 3*c* shows the case in which $Z_1$ is a resistor and has the characteristics of a variable inductor shunted by a resistor denoted RL as in FIGS. 4 to 7, to be described below. The modification limitation is provided by the resistor $R_L$. The compression and expansion curves of the general type shown in FIG. 3*c* are highly suitable for use in noise reduction systems; they provide noise reduction without perceptible noise modulation effects and without significant accentuation of recording or transmission defects. In the discussions to follow, the noise reduction systems will be of the type shown in FIG. 3*c*.

In FIGS. 4, 5, 6 and 7, examples are given of Type 1, Type 2, Type 3 and Type 4 noise reduction systems respectively. In all cases the examples treat the high frequency portion of the spectrum since this is often of greatest practical interest in audio, video, and other applications. The type of probe tone response provided is as shown in FIG. 3*c*. In all cases a high frequency boosting or bucking action of 10 dB is provided (10 dB is a voltage or current factor of 3.16). It will be appreciated that noise reduction systems with much more complexity of characteristics can be provided and that the given examples merely illustrate the general principle in a uniform way so that the relationships of the various configurations can be understood.

In all of the applicant's compressor, expander and noise reduction system inventions the control signal is preferably taken from a point in the circuit at which the voltage or current is limited to a small value at high signal levels. Therefore in the Type 1 and Type 2 series mode embodiments shown in FIG. 4 and FIG. 5 the control voltage $Z_s$ is derived from the voltage across the variable impedance means L. The control voltage is rectified and smoothed by a circuit 18 to produce a varying DC voltage corresponding to the AC signal voltage. The DC control signal varies the parameters of the frequency selective impedance network in such a way that high level signal components are excluded from dynamic range modification.

FIG. 4 shows the Type 1 case in which the linear signal component is provided by the 1K resistor $Z_1$ and the variable or non-linear component is provided by the frequency selective impedance network comprising the 2.16 K resistor RL and the variable inductor L, as described in the aforementioned specification (1) concerning serially connected impedance networks. The inductor L may have a limiting inductance which governs the turnover frequency under quiescent conditions. The control circuit 18 responds to the voltage $V_s$ across the inductor and limits this voltage to a small fractional part of the voltage $V_2$ under high-level input signal conditions. $V_2$ is therefore essentially the voltage dropped across $Z_1$.

Under low-level conditions at high frequencies the inductor L has a high reactance in comparison with the 2.16 K resistance. $V_2$ is now dropped across $Z_1$ and $R_L$ in series. A 10 dB boost of the compressor output $V_2$ is thereby produced. The complementary expander is also shown, driven from a voltage source $V_3$ and producing an output signal $V_4$ in response to the current $i_2$. In both the compressor and the expander the frequency selective impedance network operates under identical or proportional conditions. In both cases the inductor L has a large value at low levels and a small value at high levels.

In the Type 2 noise reduction system shown in FIG. 5 the linear signal component is provided by the 3.16 K resistor $Z_1$, and the variable component is provided by the −2.16 K resistance $R_L$ and the variable inductor L. The variable inductor has a large value at low levels and a small value at high levels. At low levels and at low frequencies the inductive reactance is small in comparison with the −2.16 K resistance, which is thereby shunted. The overall resistance is thus 3.16 K and this provides the unmodified current $i_1$ in response to the input voltage $V_1$. At low levels and at high frequencies the inductive reactance becomes large in comparison with the −2.16 K resistance. The negative resistance cancels a portion of the positive resistance, resulting in a net circuit resistance of 1 K. This provides the modified or compressed characteristic, the current being 3.16 times higher than in the 3.16 K condition prevailing at low frequencies. A current-to-voltage converter then provides the compressor output voltage $V_2$.

The recorded or transmitted signal $V_3$ is converted into a current $i_2$ which flows through the 3.16 K resistor $Z_1$ and $Z_s$. The same applied signal $i_2$ is thus used to derive both the linear and non-linear component of the output signal. This is in accordance with the Type 2 parallel mode configuration as shown in FIG. 2*a*. In the series mode the output signal is thus the combination of the linear voltage component and the non-linear component provided by $Z_s$. At low levels at low frequencies the inductive reactance of L is small in comparison with the −2.16 K resistance. The inductor thus shunts the negative resistance, thereby preventing any bucking of the linear voltage component. Thus, the unmodified dynamic characteristic is produced. At low levels but at high frequencies the inductive reactance is high in comparison with the −2.16 K resistance $R_L$. The negative resistance therefore cancels part of the positive resistance, resulting in a net circuit resistance of 1K. This produces an attenuated voltage $V_4$ to appear across the output terminals in response to the current $i_2$. At high levels the inductance is reduced, which shunts the negative resistance and results in the unmodified voltage appearing at the output terminal.

The corresponding Type 3 and Type 4 compressors, expanders and noise reduction systems are shown in FIGS. 6 and 7. In the Types 3 and 4 configurations conveying means instead of limiting or restricting means are used in the further paths of the parallel mode. In the series mode the corresponding frequency selective impedance network permits a high voltage to be developed thereacross at high levels, instead of a low voltage as in the case of the Types 1 and 2 series mode configurations. Thus, instead of the voltage across, the current $i_c$ through the variable impedance means of the frequency selective impedance network is limited to a small value at high signal levels. Hence, in the examples shown in FIG. 6 and FIG. 7, the control signal is derived from the current through the variable capacitor C. A DC control signal is obtained by rectifying and smoothing the control circuit input signal $i_c$ by the control circuit 19 and is used to vary the value of the capacitor. The sense of the control is such that the capacitance is large at low levels and becomes small at high levels.

Referring to FIG. 6, the operation of the Type 3 system is as follows. The input voltage $V_1$ is converted to a current $i_1$ which drives the combination. At low levels at low frequencies the capacitive reactance is large in comparison with the −2.16 K resistance $R_L$. The negative resistance thus partially cancels the positive resistance, resulting in a net 1 K resistance, which provides the unmodified dynamic characteristic. At high frequencies the capacitor has a low reactance in comparison with the −2.16 K resistance. The shunting action therefore eliminates the effect of the negative resistance. The full 3.16 K positive resistance then provides the modified or boosted compressor output signal $V_2$. If a high level signal component appears at a particular frequency, the capacitance will be reduced to exclude the frequency from dynamic modification.

The corresponding expander is driven from a voltage source $V_3$ and the output voltage $V_4$ is obtained in response to the resulting current $i_2$. At low levels at low frequencies the high capacitive reactance allows partial cancellation of the positive resistance by the negative resistance, resulting in a high current to provide the unmodified dynamic characteristic. At high frequencies at low levels the capacitive reactance is low enough to shunt the negative resistance. The full value of the positive resistance therefore results in a decreased current which provides an attenuated or expanded output signal $V_4$.

In the Type 4 configuration shown in FIG. 7 the compressor is driven from a voltage source $V_1$ which results in a current $i_1$, from which the compressor output signal $V_2$ is derived. At low frequencies at low levels the capacitive reactance is large in comparison with the 2.16 K resistor $R_L$. The 3.16 K total resistance therefore provides the unmodified dynamic characteristic. At low levels at high frequencies the small value of the capacitive reactance shunts the 2.16 K resistor, which boosts the current $i_1$ and provides a boosted or compressed output voltage $V_2$. At high signal levels the capacitance value is reduced and causes the output signal to revert to the unmodified state.

In the Type 4 expander the input voltage $V_3$ is converted into the current $i_2$ which passes through the combination. The output voltage $V_4$ is the voltage developed across the combination. At low levels at frequencies the high capacitive reactance results in an essentially resistive circuit of 3.1 K resistance. This produces an unmodified output signal $V_4$. At high frequencies the capacitor shunts the 2.1 K resistor $R_L$ and reduces or attenuates the voltage $V_4$. Under high level conditions the value of the capacitor is reduced to such an extent that the unmodified characteristic is obtained.

FIG. 8 shows a generalized representation of a frequency selective impedance network $Z_s$ into two terminals 1 and 2. The function $F(i)$ has the property of developing a voltage $V_s$ across the network terminals 1 and 2 in response to a current $i$ flowing through the network. Conversely if a voltage $V_s$ is applied to the terminals the function $F(i)$ causes a current $i$ to flow. The impedance $Z_s$ is the quotient of $V_s$ and $i$. These properties are of course those of any two-terminal impedance.

FIG. 8a shows in somewhat more practical terms and in the context of the present invention the meaning of the generalized representation of FIG. 8. The impedance $Z_s$ may of course be completely passive, but greater flexibility of characteristics is possible by the use of active elements. The use of negative resistance characteristics, for example, is made feasible by active techniques. FIG. 8a shows an impedance $Z_s$, that is the quotient of $V_s$ and $i$. In this case $Z_s$ between terminals 1 and 2, is shown as completely isolated from any supply reference, but in many situations it is not a great disadvantage if one of the terminals is connected to a reference. In the example of low value resistance 35 is used to monitor the current. The resulting signal is coupled through a transformer 36 and amplifier 37 and is then processed by the noise reduction circuitry 38 as required, the resulting noise reduction signal $V_s$ finally appearing in the circuit between terminals 1 and 2.

Thus, the signal $V_s$ is coupled between the terminal 1 and 2 by a low output impedance amplifier 39 and a transformer 40. Positive values of resistance are produced if the current results in a signal around the loop which is of such polarity that $V_s$ has the same polarity as would be produced by a normal resistor. Negative values of resistance are created if the current results in a signal around the loop which is of such polarity that $V_s$ has a polarity opposite from that which would be produced by a normal resistor. The selection of polarity is illustrated by indicating that amplifiers 39 is either non-inverting or inverting. In both cases the value of the resistance depends on the loop gain. Reactive components of $Z_s$ are formed by the use of reactances in the loop. The type of reactance produced will depend on the polarity and type of reatance used in the loop.

In previous examples and discussions only the simplest types of frequency selective impedance networks have been considered by way of illustrating the general principle of the invention. FIG. 9 shows a more sophisticated frequency selective impedance network which is suitable for use in a consumer noise reduction system. The resultant properties of the noise reduction system have been described in the previously mentioned specification (5). A voltage $V_s$ is produced in response to the current $i$ by the impedance function $F(i)$. A fixed high-pass filter constituted by $C_1$ and $R_1$ with a cut-off frequency of 1.5 kHz is driven in response to the current $i$. The output of the fixed high-pass filter is applied to a variable high-pass network comprising a series capacitor $C_2$ and a shunt variable resistance $R_v$. For optimum phase response, capacitor $C_2$ is shunted by a resistor $R_2$ with a time constant $R_2C_2$ corresponding to a 750 Hz turnover frequency. The variable resistance $R_v$ is controlled in response to the voltage $V_s$ developed thereacross in such a sense as to limit the voltage $V_s$ under high signal level conditions. The voltage $V_s$ thereby produced is applied in series with the circuit. The frequency selective impedance network shown in FIG. 9 is normally used in the the Type 1 configuration either as shown in FIG. 1c or in FIG. 4, to produce an overall dynamic range modification and noise reduction of approximately 10 dB above about 1.5 kHz.

FIG. 10 shows a frequency selective impedance network for use in a professional noise reduction system. A frequency selective network comprising four parallel paths 20 to 23 is driven in response to the current $i$ flowing through the circuit. Each path includes a frequency selective filter 24 followed by a limiter circuit 25 with a low-level threshold. The outputs of all of the limiters are combined by a circuit 26 to produce the signal $V_s$ which is applied in the series circuit. Under low-level conditions signals pass through all of the parallel paths, resulting in a modified characteristic over the full audio bandwidth. If a high level signal appears at any particular frequency, the limiter corresponding to that frequency ban greatly attenuates the signal, thereby narrowing or restricting the range of frequencies in which dynamic modification takes place. The frequency selective impedance $Z_s$ which is thereby produced is normally utilized in the Type 1 configuration shown in FIG. 1c and FIG. 4 to produce an overall dynamic range modification and noise reduction of approximately 10 db.

In both of FIGS. 9 and 10 the pick off of *i* and the insertion of $V_s$ is shown symbolically. In practice the techniques of FIG. 8*a*, for example, may be used.

With abrupt increases in signal level an overshoot may be produced in the signal $V_s$. As shown in FIG. 9*a*, it is possible to limit these to a low amplitude even under extreme transient conditions by the use of a non-linear limiter 27 comprising, for example, non-linear elements such as diodes. Constant current diodes can be similarly used if the variable impedance current, not voltage, is limited to a small value at high input signal levels. The diodes can be connected or coupled to the variable resistance $R_v$ or they can act anywhere later in the circuit, such as to limit overshoots in the signal $V_s$. With reference to FIGS. 4 to 7, the limiter 27 is applied in such a way as to be effective at $Z_s$, as shown in FIG. 4*a*, for example.

The signal level at the point at which the diodes are applied should be such that a good limiting action is achieved with conventional diodes. Sometimes, however, the available signal voltage is too low. In such instances it is possible to use an amplifying negative feedback loop, including the diodes 28 and an inverting amplifier 29 as shown in FIG. 9*b*. The voltage swing required at the input is reduced by the factor of the gain of the feedback loop, the effect of which is to shift the limiting threshold in the opposite direction from that of the input signal.

In a modification of the circuit shown in FIG. 10 each of the frequency bands may be individually driven in response to the current *i* and may have its output signal produced thereby individually inserted into the series circuit. The series combination of the individual voltages produced thereby form the voltage $V_s$ and the overall frequency selective impedance $Z_s$.

If $V_3$ is obtained from $V_2$ by way of a transmission path, a complete noise reduction system requires a separate compressor and expander. If however $V_3$ is obtained from $V_2$ by means of a record/playback process basically the same circuit can be used as compressor and expander given appropriate mode switching facilities. As one example of this possibility FIG. 11 shows the circuit of FIG. 1*c* provided with ganged switches $S_1$ and $S_2$ for establishing either the record (compression) mode R or the playback (expansion) mode P.

$V_1$ is supplied by a high impedance (current) source 30 in the record mode, but in the playback mode a low output impedance amplifier 31 is switched into circuit to povide voltage drive. A small pick-off resistor $Z_P$ is placed in series with $Z_1$ and $Z_s$. In the record mode $V_2$ is taken by $S_2$ across the series combination of $Z_1$, $Z_s$ and $Z_p$. In the playback mode $V_4$ is proportional to the current through this combination since it is picked off across $Z_p$ only, an amplifier 32 being included to establish the correct level for $V_4$.

FIG. 11 can equally well represent a mode switching version of FIG. 2*c*. It is merely necessary to interchange the designation R and P on the switches $S_1$ and $S_2$.

I claim:

1. A circuit for modifying the dynamic range of an input signal, comprising at least one impedance means, input terminals for energising the impedance means in accordance with an input signal, the impedance means comprising at least one linear impedance component providing a component of an output signal which is linear with respect to dynamic range at any given frequency, and means effectively providing a variable impedance which includes an equivalent negative resistance component and which provides a dynamic range modifying component of said output signal within at least one frequency band, said variable impedance being arranged to vary as a function of a signal in the circuit thereby to restrict said at least one frequency band within which said dynamic range modifying component is provided, and output means for deriving said output signal in accordance with either a voltage or a current in the circuit.

2. A circuit according to claim 1, wherein the relative value of the resistance of the linear impedance component is approximately 3.16 and of the equivalent negative resistance component is approximately 2.16, to provide approximately 10dB modification of dynamic range.

3. A circuit according to claim 1, wherein the relative value of the resistance of the linear impedance component is approximately 3.16 and of the equivalent negative resistance component is approximately 2.16, to provide approximately 10dB modification of dynamic range.

4. A circuit according to claim 1, wherein the magnitude of the negative resistance decreases as a function of increasing current in the circuit.

5. A circuit according to claim 4, comprising a voltage drive source connected to the input terminals and wherein the output means derive an output signal in accordance with the current through the circuit.

6. A circuit according to claim 4, comprising a current drive source connected to the input terminals and wherein the output means derive an output signal in accordance with the voltage across the circuit.

7. A circuit according to claim 1, wherein the variable impedance has a reactive component which decreases as a function of increasing current in the circuit.

8. A circuit according to claim 7, wherein the reactive component is in shunt with the equivalent negative resistance.

9. A circuit according to claim 7, comprising a voltage drive source connected to the input terminals and wherein the output means derive an output signal in accordance with the current through the circuit.

10. A circuit according to claim 7, comprising a current drive source connected to the input terminals and wherein the output means derive an output signal in accordance with the voltage across the circuit.

11. A circuit according to claim 1, wherein the variable impedance means comprises a negative resistance component shunted by a variable reactance component which has a high impedance relative to the negative resistance component to one side of a turnover frequency and a negligible impedance relative to the negative resistance component to the other side of the turnover frequency, and wherein the reactance varies as the input signal level to the said one side of the turnover frequency varies so as to shift the turnover frequency.

12. A circuit according to claim 11, wherein the said one and other side of the turnover frequency are above and below the turnover frequency respectively and wherein the turnover frequency rises as the input signal level above the turnover frequency increases.

13. A circuit according to claim 11, wherein the variable reactance is varied in response to a control signal derived by rectifying and smoothing the voltage across the variable reactance.

14. A circuit according to claim 11, wherein the variable reactance has the characteristics of a variable inductor.

15. A circuit according to claim 1, wherein the magnitude of the negative resistance component increases as a function of increasing current in the circuit.

16. A circuit according to claim 15, comprising a current drive source connected to the input terminals and wherein the output means derive an output signal in accordance with the voltages across the impedance means.

17. A circuit according to claim 15, comprising a voltage drive source connected to the input terminals and wherein the output means derive an output signal in accordance with the current through the circuit.

18. A circuit according to claim 1, wherein the variable impedance has a reactive component which increases as a function of increasing current in the circuit.

19. A circuit according to claim 18, wherein the reactive component is in shunt with the equivalent negative resistance.

20. A circuit according to claim 18, comprising a current drive source connected to the input terminals and wherein the output means derive an output signal in accordance with the voltages across the impedance means.

21. A circuit according to claim 18, comprising a voltage drive source connected to the input terminals and wherein the output means derive an output signal in accordance with the current through the circuit.

22. A circuit according to claim 1, wherein the variable impedance means comprises a negative resistance component shunted by a variable reactance component which has a negligible impedance relative to the negative resistance component to one side of a turnover frequency and a high impedance relative to the negative resistance component to the other side of the turnover frequency, and wherein the reactance varies as the input signal level to the said one side of the turnover frequency varies so as to shift the turnover frequency.

23. A circuit according to claim 22, wherein the said one and other side of the turnover frequency are above and below the turnover frequency respectively and wherein the turnover frequency rises as the input signal level above the turnover frequency increases.

24. A circuit according to claim 22, wherein the variable reactance is varied in response to a control signal derived by rectifying and smoothing a signal derived from the current through the variable reactance.

25. A circuit according to claim 22, wherein the variable reactance has the characteristics of a variable capacitance.

26. A circuit according to claim 1, wherein the variable impedance means comprises two terminals, a current path extending between the two terminals, and a frequency selective circuit responsive to the current flowing in the current path to introduce into the current path between the two terminals a voltage of such polarity as to create the characteristics of an impedance which includes the said negative resistance component.

27. A circuit according to claim 26, wherein the frequency selective circuit includes a variable filter.

28. A circuit according to claim 26, wherein the frequency selective circuit comprises a plurality of signal paths to provide path output signals, and means for combining the path output signals to provide the said introduced voltage, each signal path comprising a filter defining a frequency band individual to the path and limiting means.

29. A circuit for modifying the dynamic range of an input signal, comprising first and second impedance means connected in a series combination, input terminals for energising the combination in accordance with an input signal, the first means comprising at least one resistor and providing characteristics which are linear with respect to dynamic range at any given frequency, the second means effectively providing a variable impedance arranged to vary as a function of a signal in the combination, and output means for deriving an output signal in accordance with a voltage or a current in the combination, and wherein the second means comprises two terminals, a current path extending between the two terminals, and a frequency selective circuit responsive to the current flowing in the current path to introduce a voltage into the current path between the two terminals, and wherein the frequency selective circuit comprises a series combination of two filters arranged to develop the said introduced voltage, one filter being a filter having fixed high pass characteristics and the other having variable high pass characteristics, the variable characteristics so varying as to restrict the said introduced voltage to a small fractional part of the voltage across the said first means at maximum signal level.

30. A circuit according to claim 29, wherein the voltage introduced into the current path is of such polarity as to give the second means the characteristics of an impedance including positive resistance.

31. A circuit according to claim 30, wherein the frequency selective circuit is operative above about 1.5 kHz and wherein the relative value of the resistance of the first means is 1.00 and of the resistive component of the second means is approximately 2.16, to provide approximately 10dB modification of dynamic range.

32. A circuit according to claim 30, comprising a current drive source connected to the input terminals and wherein the output means derive an output signal in accordance with the voltage across the combination.

33. A circuit according to claim 30, comprising a voltage drive source connected to the input terminals and wherein the output means derive an output signal in accordance with the current through the combination.

34. A circuit for modifying the dynamic range of an input signal, comprising first and second impedance means connected in a series combination, input terminals for energising the combination in accordance with an input signal, the first means comprising at least one resistor and providing characteristics which are linear with respect to dynamic range at any given frequency, the second means effectively providing a variable impedance arranged to vary as a function of a signal in the combination, and output means for deriving an output signal in accordance with a voltage or a current in the combination, and wherein the second means comprises two terminals, a current path extending between the two terminals, and a frequency selective circuit responsive to the current flowing in the current path to introduce a voltage into the current path between the two terminals, and wherein the frequency selective circuit comprises a variable filter whose characteristics so vary as to restrict the said introduced voltage to a small fractional part of the voltage across the said first means at maximum signal level, and instantaneous limiting means connected to suppress overshoots of said introduced voltage above said small fractional part.

35. A circuit for modifying the dynamic range of an input signal, comprising first and second impedance means connected in a series combination, input terminals for energising the combination in accordance with an input signal, the first means comprising at least one resistor and providing characteristics which are linear with respect to dynamic range at any given frequency, the second means effectively providing a variable impedance arranged to vary as a function of signals in the combination, and output means for deriving an output signal in accordance with a voltage or a current in the combination, and wherein the second network comprises two terminals, a current path extending between the two terminals, and a frequency selective circuit responsive to the current flowing in the current path to introduce a voltage into the current path between the two terminals, and wherein the frequency selective circuit comprises a plurality of signal paths arranged to provide path output signals, and means for combining the path output signals to provide the said introduced voltage, each signal path comprising a filter defining a frequency band individual to the path and limiting means.

36. A circuit according to claim 35, wherein the voltage introduced into the current path is of such polarity as to give the second means the characteristics of an impedance including positive resistance.

37. A circuit according to claim 36, wherein the paths of the frequency selective circuit pertain to four audio frequency bands and wherein the circuit provides a dynamic range modification of approximately 10dB.

38. A circuit according to claim 36, comprising a current drive source connected to the input terminals and wherein the output means derive an output signal in accordance with the voltage across the combination.

39. A circuit according to claim 36, comprising a voltage drive source connected to the input terminals and wherein the output means derive an output signal in accordance with the current through the combination.

40. In a circuit wherein the dynamic range of a signal is modified within a restricted frequency band by the action of a frequency selective circuit which is responsive to signal components exceeding a selected value within said frequency band to narrow said frequency band to exclude said components from dynamic range modification, the improvement wherein:

said frequency selective circuit comprises a variable equivalent negative resistance whose variation in response to said components effects said narrowing of said frequency band.

* * * * *